US005819614A

United States Patent [19]
Jander

[11] Patent Number: 5,819,614
[45] Date of Patent: Oct. 13, 1998

[54] METHOD FOR DISPENSING REINFORCEMENT FIBERS

[75] Inventor: Michael H. Jander, Kettenis, Belgium

[73] Assignee: N.V. Owens-Corning S.A., Battice, Belgium

[21] Appl. No.: 770,060

[22] Filed: Dec. 19, 1996

Related U.S. Application Data

[63] Continuation of Ser. No. 419,621, Apr. 10, 1995, abandoned.

[51] Int. Cl.$^6$ ........................................................ B26D 1/00
[52] U.S. Cl. .................................. 83/13; 83/907; 83/913; 29/417; 156/167; 242/361.2
[58] Field of Search ............................... 83/913, 907, 13; 156/167, 169, 174; 29/417; 242/361.2, 361.3

[56] References Cited

U.S. PATENT DOCUMENTS

| | | | |
|---|---|---|---|
| 3,719,540 | 3/1973 | Hall | 156/167 X |
| 3,831,879 | 8/1974 | Miller et al. | 156/169 X |
| 3,977,069 | 8/1976 | Domaingue, Jr. | 29/417 X |
| 4,001,935 | 1/1977 | Krohn et al. | |
| 4,169,397 | 10/1979 | Vehling et al. | 83/913 X |
| 4,178,670 | 12/1979 | Schmid | 29/417 |
| 4,417,937 | 11/1983 | Escher et al. | 156/169 |
| 4,519,281 | 5/1985 | Spaller | 83/913 X |
| 4,630,515 | 12/1986 | Spaller | 83/913 X |
| 4,750,960 | 6/1988 | Bubeck | 156/169 |
| 4,944,446 | 7/1990 | Thompson | 29/417 X |
| 5,020,403 | 6/1991 | D'Angelo et al. | 29/417 X |
| 5,158,631 | 10/1992 | Leoni et al. | 156/174 |
| 5,192,390 | 3/1993 | Perkins | 156/174 X |
| 5,204,033 | 4/1993 | Pearce et al. | 156/174 X |
| 5,463,919 | 11/1995 | Paybarah et al. | 83/907 X |

FOREIGN PATENT DOCUMENTS

| | | | |
|---|---|---|---|
| 1694724 | 11/1991 | U.S.S.R. | 83/913 |
| 9501939 | 1/1995 | WIPO . | |

OTHER PUBLICATIONS

Jander., "Industrial RTM: New developments in molding and performing technologies" (1991).
Ericsson, "Processing, Structure and Properties of Glass Mat Reinforced Thermoplastics" (1992) pp. 65–101.

Primary Examiner—Maurina T. Rachuba
Attorney, Agent, or Firm—C. Michael Gegenheimer; Inger H. Eckert

[57] ABSTRACT

A method for dispensing reinforcement fibers to make a preform or laminate includes winding a continuous length of a reinforcement fiber into coils around a form having a longitudinal axis, moving the coils axially with respect to the form to engage a cutter, cutting the coils to form discrete length reinforcement fibers, and dispensing the discrete length reinforcement fibers.

14 Claims, 6 Drawing Sheets

METHOD FOR DISPENSING REINFORCEMENT FIBERS

CROSS-REFERENCE TO RELATED APPLICATION

This is a continuation of U.S. patent application Ser. No. 08/419,621, filed Apr. 10, 1995, now abandoned.

TECHNICAL FIELD

This invention pertains to dispensing reinforcement fibers, particularly in the manufacture of a preform suitable for reinforcing molded articles, such as structural composites. More particularly, the invention pertains to receiving a continuous length of a reinforcement fiber, cutting the reinforcement fiber into discrete lengths, and dispensing the discrete lengths onto a collecting surface.

BACKGROUND

Structural composites and other reinforced molded articles are commonly made by resin transfer molding and structural resin injection molding. These molding processes have been made more efficient by pre-forming the reinforcement fibers into a reinforcement layer or mat, which is the approximate shape and size of the molded article, prior to inserting the reinforcements into the mold. To be acceptable for production at an industrial level, a fast preforming process is required. In the manufacture of preforms, a common practice is to supply a continuous length of reinforcement strand or fiber to a chopper, which chops the continuous fiber into many discrete length fibers, and deposits the discrete length fibers onto a collection surface. This process can be used to make preforms in an automated manner by mounting the reinforcement dispenser for movement over the collection surface, and programming the movement of the dispenser to apply the reinforcement fibers in a predetermined, desired pattern. The reinforcement dispenser can be robotized or automated, and such reinforcement fiber dispensers are known art for such uses as making preforms for large structural parts, as in the auto industry, for example.

Typically, the preforms are dusted with a powdered binder, and placed into a mold. The heat and pressure of the mold sets the binder, producing a preform of reinforcement fibers which can be stored and shipped to the ultimate molding customer which applies resin to the preform and molds the resinated preform to make a reinforced product, typically using a resin injection process. The process of cutting continuous reinforcement fibers into discrete lengths of reinforcement fibers is useful in the manufacture of laminates as well as in the manufacture of preforms. Dispensers of reinforcement fibers for the manufacture of laminates can also be adapted to be moveable and programmable.

As the technical requirements for reinforcement products increases, new methods for dispensing and laying down reinforcement fibers are required. One requirement is that the reinforcement fibers be delivered at faster speeds than used previously. Another requirement is that the reinforcement fibers be laid down in a predetermined orientation. The advancement in the preform making technology enabling a moveable and programmable reinforcement fiber dispenser has led to requirements for very sophisticated fiber patterns and orientations. Preforms can be designed with specific amounts and orientations of reinforcement fibers to improve the strength of the molded product precisely at the weakest or most stressed location of the product to be molded. Because of this new sophistication, there often is a requirement that the fibers be laid onto the collecting surface in a closely spaced, parallel arrangement.

Efforts to deliver closely spaced, generally parallel fibers have not been successful, especially at the high speeds necessary for commercially successful operations. When typical strand chopper nozzles are operated at a faster speed, the resulting discrete reinforcement fibers cannot be successfully laid down in a parallel, closely spaced orientation. The fibers are directed toward the collecting surface in a direction generally perpendicular to the collection surface, and this procedure does not tend to leave the fibers generally parallel and closely spaced. Further, typical nozzle dispensing devices use an air flow to guide the reinforcement fiber into engagement with the chopper blade, and to dispense the discrete fibers after cutting, thereby introducing turbulence to the preform collection surface.

It is clear that improvements in cutting continuous reinforcement fibers into discrete lengths and dispensing them in a closely spaced, generally parallel arrangement would be desirable.

DISCLOSURE OF INVENTION

There has now been developed a method and apparatus for dispensing reinforcement fibers which overcome the disadvantages of previously developed methods. The method of the invention winds the continuous reinforcement fiber around a form, such as a cylinder or a pair of rods, to form loops or coils. The coils are then slid or moved axially of the form where the coils engage a cutter. The coils are cut into discrete length fibers, and they are dispensed in a generally parallel, closely spaced arrangement. The method of the invention enables the input speed of the continuous fiber to increase, while still delivering the discrete reinforcement fibers in an orientation generally parallel to the collection surface.

According to this invention, there is provided a method for dispensing reinforcement fibers comprising winding a continuous length of a reinforcement fiber into coils around a form having a longitudinal axis, moving the coils axially with respect to the form to engage a cutter, cutting the coils to form discrete length reinforcement fibers, and dispensing the discrete length reinforcement fibers. Generally, the discrete length reinforcement fibers are dispensed in an axial direction with respect to the form, although they could be dispensed in another direction by means of an airjet or baffle if desired.

The method of the invention enables the discrete length reinforcement fibers to be dispensed relatively parallel to each other. If the collection surface is generally horizontal, the discrete length reinforcement fibers can be dispensed generally parallel to the collecting surface. In a specific embodiment, the discrete length reinforcement fibers are oriented generally perpendicular to the axis of the form as they are dispensed.

In a specific embodiment of the invention, the form around which the continuous reinforcement fiber is wound to form the coils comprises two or more rods. The form can also be a cylinder around which the continuous reinforcement fiber is wound into coils. In another embodiment, the form is a conical member around which the continuous reinforcement fiber is wound into coils.

In yet another embodiment of the invention, the cutter is a knife blade. The cutter can be adapted to cut each coil once to make a single discrete length reinforcement from each loop, or two or more cutters can be used to make two or more discrete length reinforcements from each loop. A guide can be used to direct the discrete length reinforcements so that they are dispensed generally parallel to each other.

In a preferred embodiment of the invention, the movement of the coils axially with respect to the form to engage the cutter is accomplished by engaging the coils with a helical surface, which may be one or more helical springs which rotate relative to the coils.

According to this invention, there is also provided apparatus for dispensing reinforcement fibers comprising a form having a longitudinal axis, a winder for winding a continuous length of a reinforcement fiber into coils around the form, a cutter for cutting the coils to form discrete length reinforcement fibers, a coil mover for moving the coils axially with respect to the form to engage the cutter and dispense the discrete length reinforcement fibers.

BEST MODE FOR CARRYING OUT THE INVENTION

Figure 1:
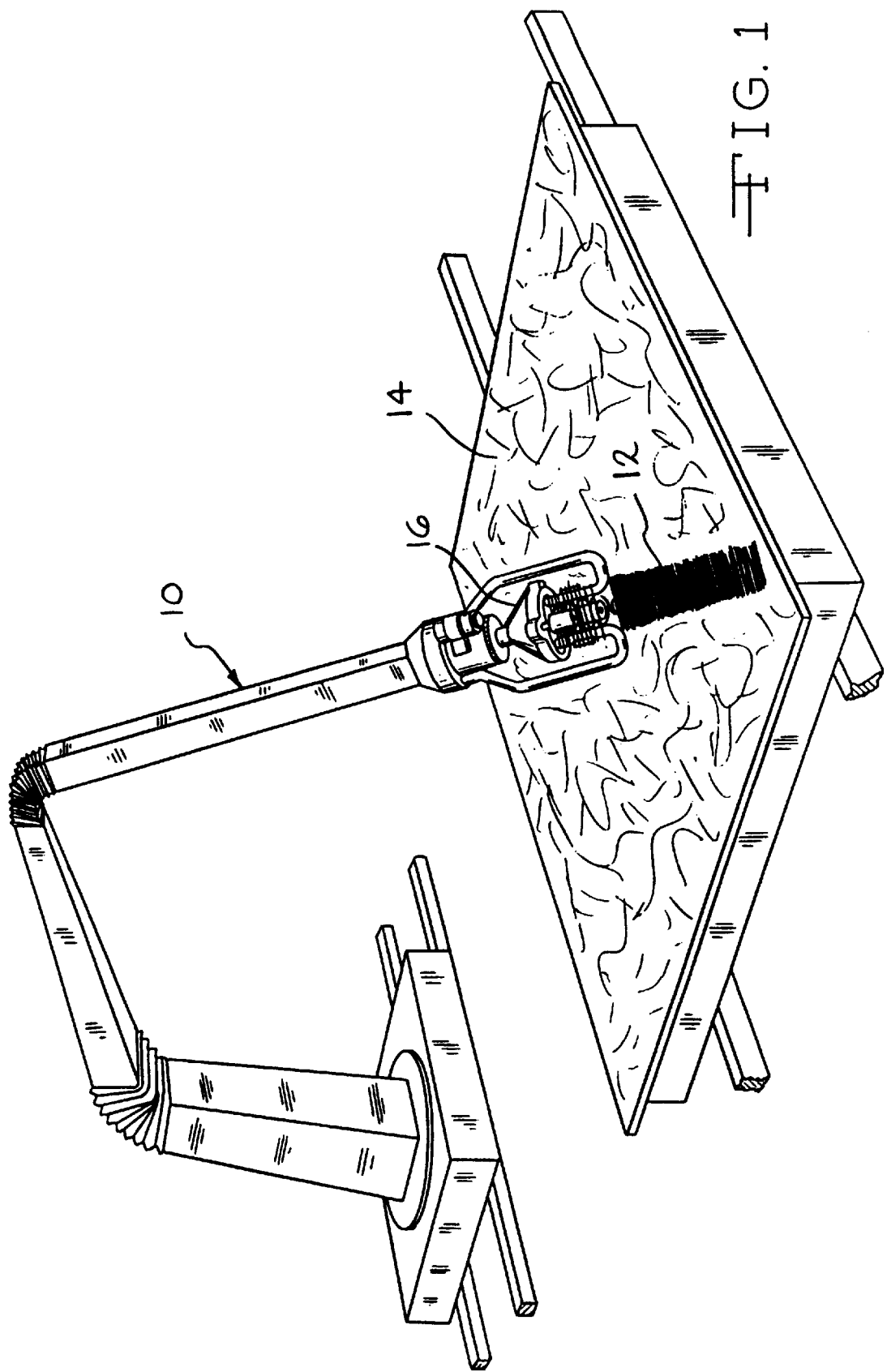
FIG. 1 is a schematic view in perspective illustrating a reinforcement dispenser depositing discrete reinforcement fibers onto a preform molding surface.

As shown in FIG. 1, a robotized reinforcement dispenser 10 is positioned to deposit discrete reinforcement fibers 12 onto a collection surface, such as preform molding surface 14. Typically the preform molding surface is a screen. The reinforcement dispenser need not be robotized or automated, and could even be stationary with the collection surface being moveable. A source of vacuum is usually positioned beneath the screen to facilitate the preform making process. Continuous reinforcement fiber 16, supplied from a source not shown, is transported to the fiber dispenser where the continuous reinforcement fiber is chopped or cut to produce the discrete length reinforcement fibers. The continuous reinforcement fiber can be any material suitable for reinforcement purposes. A preferred material is Type 30® glass fibers, available from Owens-Corning Fiberglass Corporation, Toledo, Ohio, although other mineral fibers and organic fibers, such as polyester, Kevlar® and carbon fibers, can be used with the invention. It is to be understood that the continuous fiber can be a single filament (monfilament) or a strand comprised of numerous filaments.

Figure 2:
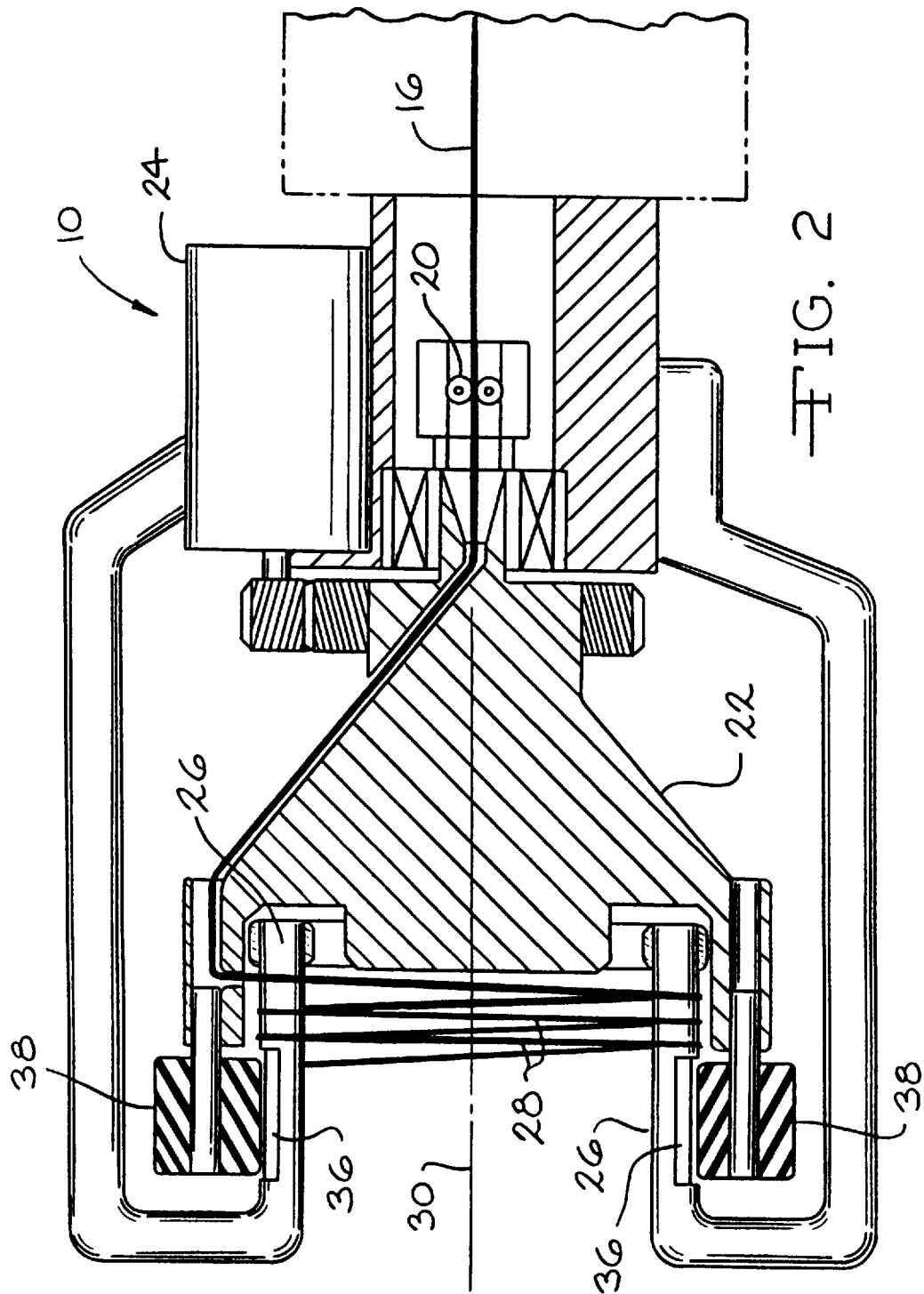
FIG. 2 is a schematic cross-sectional view in elevation of the reinforcement dispenser for dispensing reinforcement fibers according to the invention, with the helical spring removed for clarity.

As shown in FIG. 2, the continuous reinforcement fiber is fed into the dispenser by means of feed wheels 20, which also act to reduce the tendency of fiber twist to migrate upstream toward the continuous reinforcement source. The continuous fiber is then fed along the outer surface of a rotating member, such as rotor 22. The rotor can be mounted for rotation by any suitable means, such as by motor 24. Positioned downstream from the rotor is a form around which the continuous reinforcement fiber is wound by the rotating action of the rotor. The form can be of any shape suitable for receiving the windings of the continuous reinforcement fiber. In the embodiment shown in FIG. 2, the form comprises a pair of rods 26 around which the continuous reinforcement fiber is wound into a series of generally parallel loops or coils 28. The form (or rods 26) is not shown as moving, but it has a longitudinal axis 30, which may also be colinear with the axis of revolution of the rotor. It is to be understood that in an alternative design the form (i.e., the rods) could be rotated, and the rotor could be stationary. As can be seen from FIG. 4, the each coil is elongated, having two generally parallel lengths. In this arrangement the same result of winding the continuous reinforcement fiber into coils around the form would be provided. Also, both the form and the rotor could be mounted for rotation, and could be rotated at different rates to enable the continuous fiber to be wound around the form to create the coils.

Figure 3:
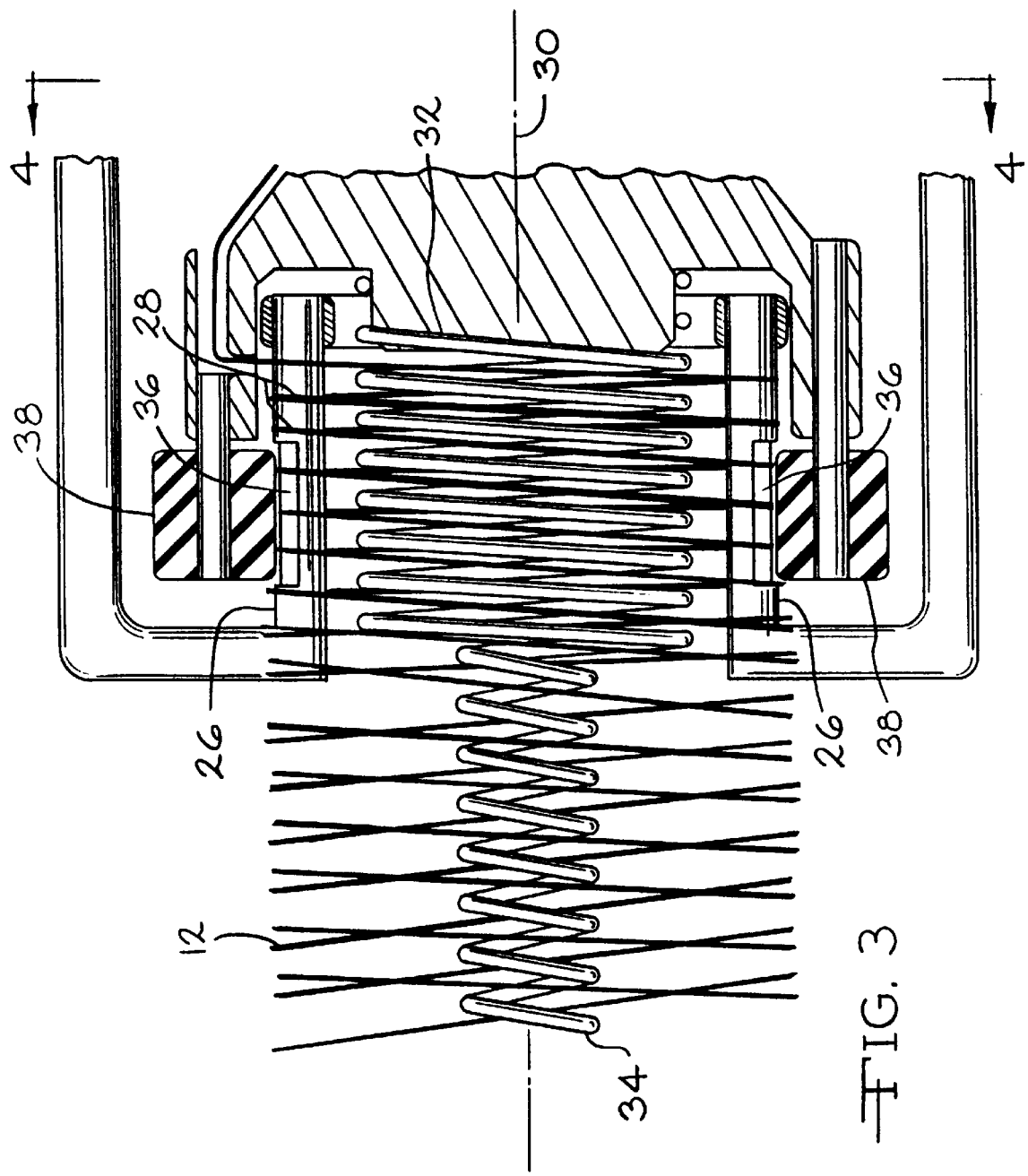
FIG. 3 is a schematic cross-sectional view in elevation of a portion of the reinforcement dispenser of FIG. 2, showing the helical spring.

Once the coils are positioned around the form, the coils are moved down stream, axially of the form (to the left in FIG. 2). Any means can be used to move the coils axially with respect to the form. As shown in FIG. 3, the coils can be moved downstream by the action of a helical surface, such as helical spring 32. For purposes of illustration the helical spring is not shown in FIG. 2. The helical spring is mounted for rotation by any suitable means, such as spring shaft 34. Rotation of the helical spring causes the surface of the spring to engage the coils of the continuous fiber and to urge the coils axially with respect to the form. Another means to move the coils axially with respect to the form is a vibrational system which vibrates the rods and uses gravity to cause the coils to move downwardly.

Figure 4:
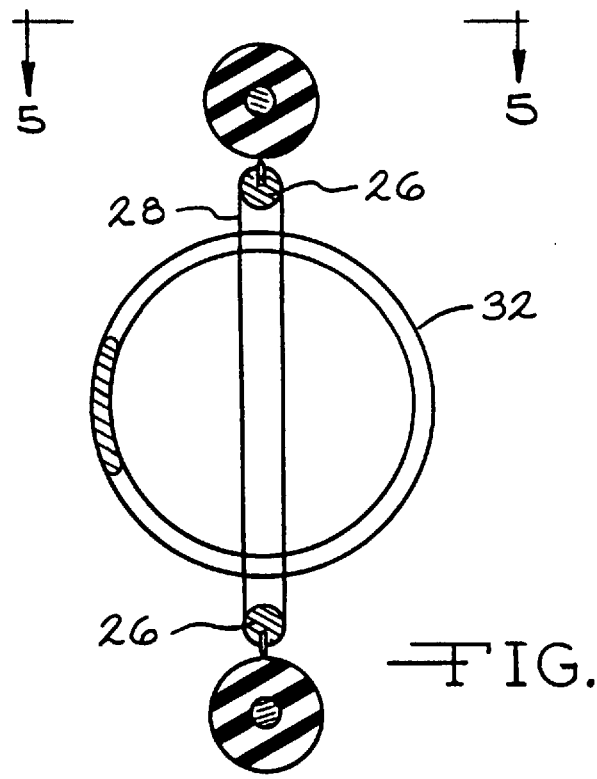
FIG. 4 is a cross-sectional plan view taken along line 4—4 of FIG. 3.
Figure 5:
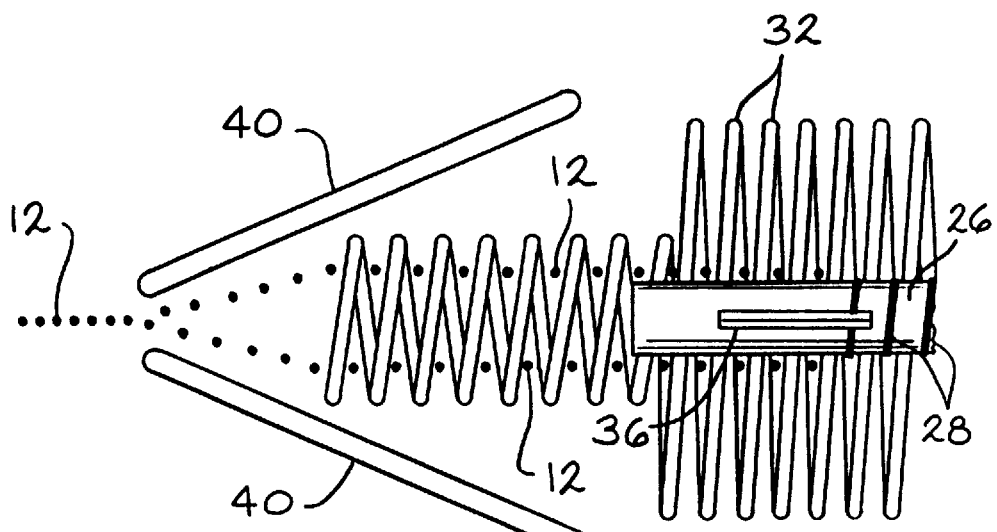
FIG. 5 is a cross-sectional view in elevation taken along line 5—5 of FIG. 4.

As the coils are moved axially with respect to the form, they are engaged by a cutter which makes one or more cuts in each loop or coil 28. The cutter can be of any type capable of severing the continuous reinforcement fiber into discrete lengths of fibers 12. Examples of cutters include heating devices and lasers. As shown in FIGS. 3–5, the cutter can be a knife mounted on the form itself, such as knives 36 mounted on each of the rods 26. Positioned adjacent the knives are cot rolls or cots 38 which act to press the continuous reinforcement fiber sharply into the knife to insure cutting rather than merely dragging the fiber across the knife. Cots used with cutters are well known, and can be of any suitable material. The cots can be mounted for rotation if desired.

As shown in FIG. 5, after the coils 28 are cut by the knife, they travel downwardly as discrete lengths of fibers 12. In order to insure that the discrete lengths of fibers are laid down in a generally parallel, closely spaced fashion on the preform molding surface, a guide, such as plates 40 can be used. The plates help align the discrete length fibers, and insure that they are dispensed in a controlled, uniform manner. Preferably, the discrete length fibers are dispensed in an axial direction with respect to the rods, but baffles or air jets could be used to dispense the discrete length fibers in other directions. Since the discrete length fibers are formed by cutting the coils, they are oriented generally perpendicular to the axis of the form as they are dispensed, and are generally parallel to the preform molding surface 14.

Figure 6:
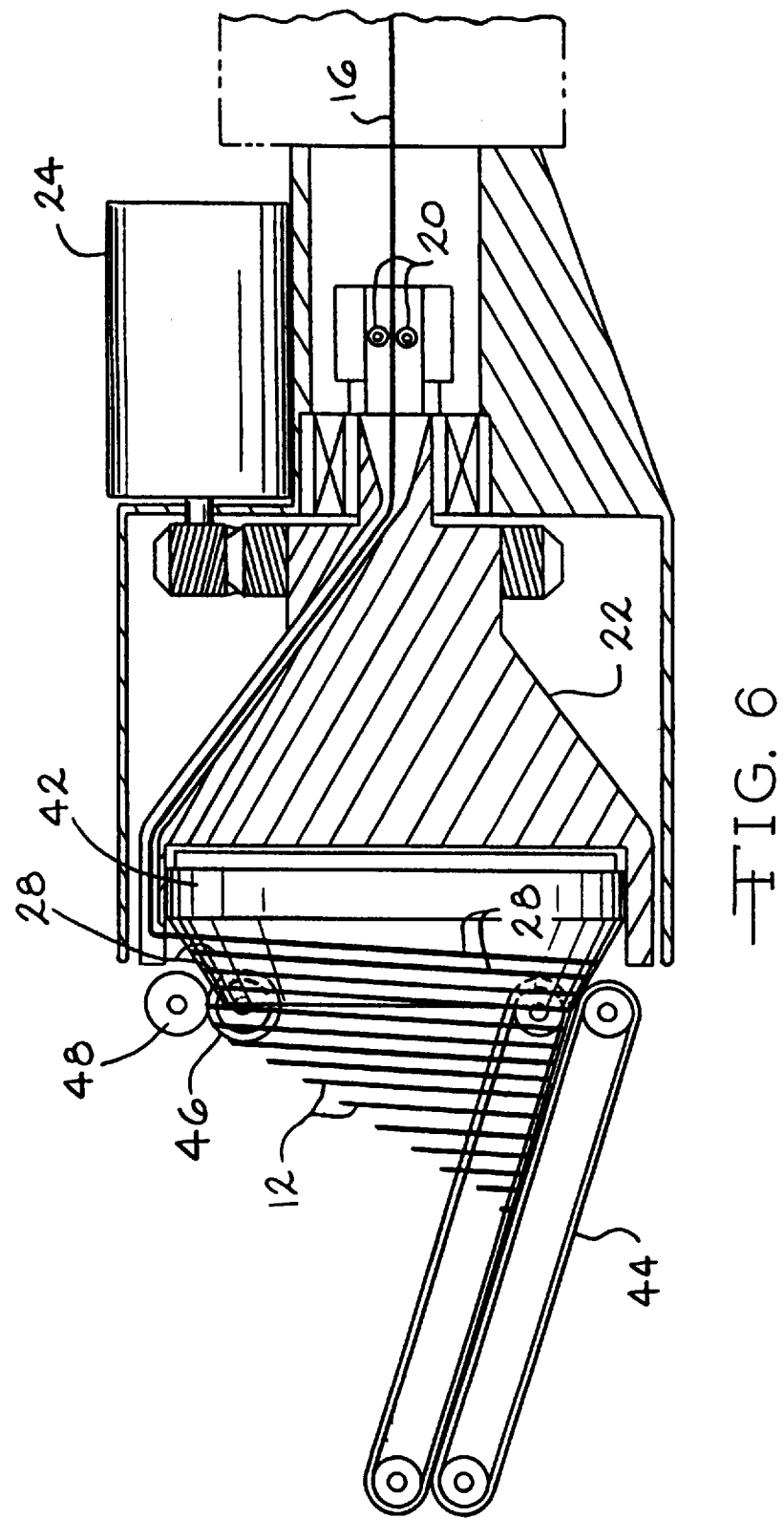
FIG. 6 is a schematic cross-sectional view in elevation of an alternative apparatus for carrying out the method of the invention.

Although the form around which the continuous reinforcement fiber 16 is wound is shown in FIGS. 2–5 as a pair of rods 26, the form can be of other configurations. For example, the form can be three generally parallel rods. The form could be a cylinder. The form could also be a conical member, as shown in FIG. 6. Conical member 42 is mounted for rotation, by means not shown, positioned downstream from rotor 22. The rotor is rotated to distribute the continuous reinforcement fiber 16 into coils 28 wrapped around the conical member. The coils are engaged or grabbed by any suitable means, such as a conveyor or belt 44 and pulled or moved axially with respect to the form, i.e., the conical member. Positioned opposite the belt is a cutter, which can be in the form of a cutter wheel 46 and a cot wheel 48. As the coils are pulled axially with respect to the conical member by the belt (to the left, as shown in FIG. 6), the coils will be cut to form discrete length fibers 12.

The method of dispensing discrete length fibers using two knives, as shown in FIGS. 2–5, results in two discrete fibers for each of the coils 28. Using only one knife, as shown in FIG. 6, results in only one discrete fiber for each coil. In such a case, it may be advantageous for the fiber handling apparatus, such as modified guide plates, not shown, to be adapted to open up the discrete length fibers after cutting, and align them in a generally parallel orientation.

Figure 7:
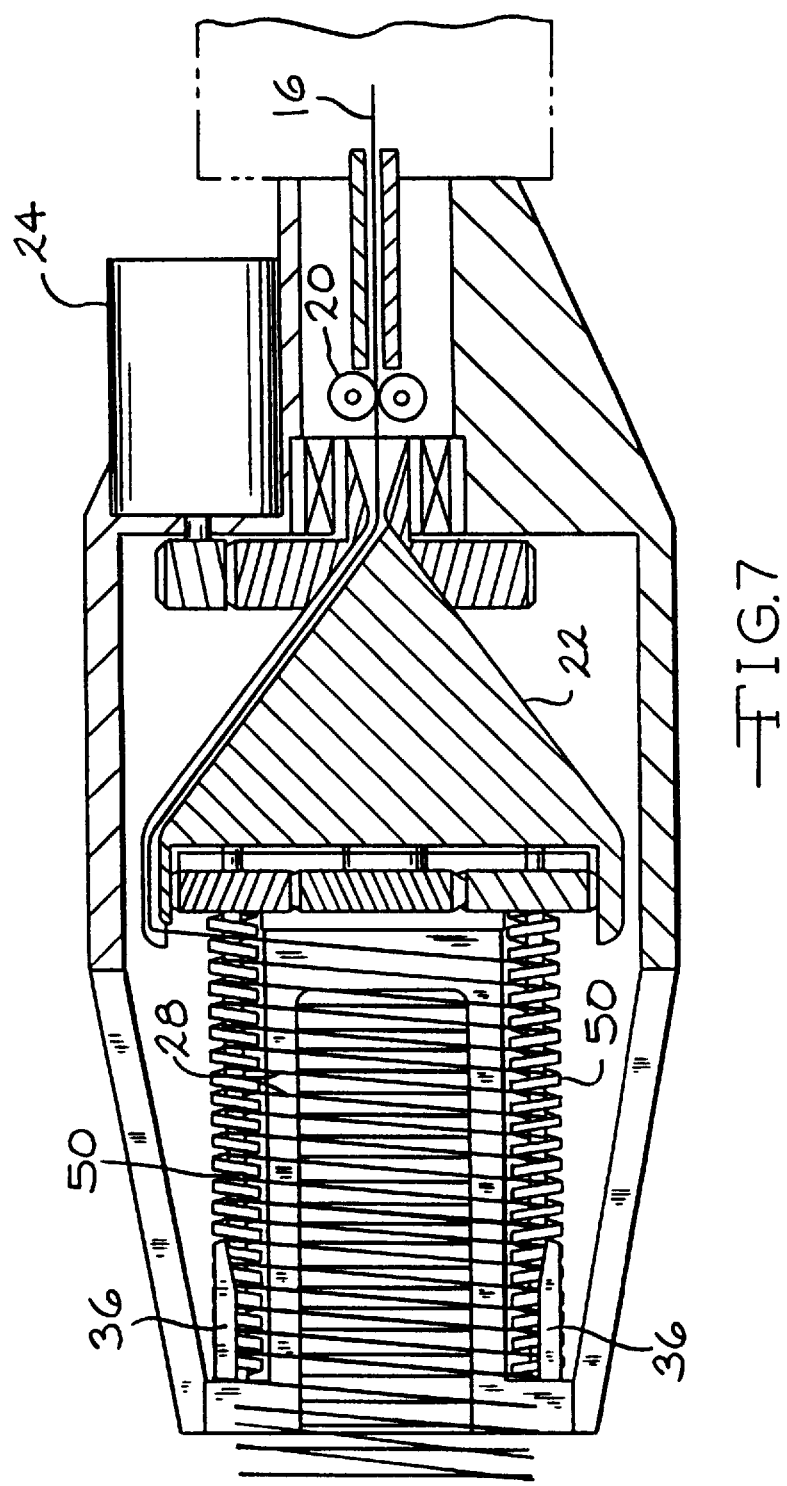
FIG. 7 is a schematic cross-sectional view in elevation of yet another apparatus for carrying out the method of the invention.

As shown in FIG. 7, the form around which the continuous reinforcement fiber 16 is to be wound can be a pair of rotating helical screws 50. The coils 28 are wound around the helical screws by the rotor 22. The rotating action of the helical screws forces the coils to move axially with respect to the form, i.e., the helical screws, and into engagement with the knife 36. Although two knives are shown in FIG. 7, one knife could be used. The knives cut the coils into discrete lengths of fibers which are dispensed in an axial direction with respect to the form (helical screws).

It will be evident from the foregoing that various modifications can be made to this invention. Such, however, are considered as being within the scope of the invention.

INDUSTRIAL APPLICABILITY

The invention can be useful in making preforms suitable for molding processes and in making reinforced laminates.

I claim:

1. A method for dispensing reinforcement fibers comprising winding a continuous length of a reinforcement fiber into coils around a form having a longitudinal axis, wherein the winding step forms each coil into an elongated shape having two generally parallel lengths, moving the coils toward a cutter and axially with respect to the form to engage the cutter while maintaining the two lengths of each coil generally parallel to each other, cutting the coils with the cutter to separate the two lengths into two discrete length reinforcement fibers that are elongated and generally parallel to each other, and dispensing the discrete length reinforcement fibers.

2. The method of claim 1 in which the discrete length reinforcement fibers are dispensed in an axial direction with respect to the form.

3. The method of claim 2 in which the discrete length reinforcement fibers are oriented generally perpendicular to the axis of the form as the discrete length reinforcement fibers are dispensed.

4. The method of claim 1 in which the discrete length reinforcement fibers are dispensed relatively parallel to each other.

5. The method of claim 1 in which the discrete length reinforcement fibers are dispensed onto a generally horizontal collecting surface, and the discrete length reinforcement fibers are dispensed generally parallel to the collecting surface.

6. The method of claim 1 in which the form comprises two rods around which the continuous reinforcement fiber is wound into coils.

7. The method of claim 1 in which the form comprises three or more rods around which the continuous reinforcement fiber is wound into coils.

8. The method of claim 1 in which the cutter is a knife blade.

9. The method of claim 1 further including the step of aligning to the discrete length reinforcement fibers with a guide in the shape of plates as the discrete length reinforcement fibers are dispensed.

10. The method of claim 1 in which the step of moving the coils axially with respect to the form to engage the cutter is accomplished by engaging the coils with a rotating helical spring which is rotating relative to the coils.

11. A method for dispensing reinforcement fibers comprising winding a continuous length of a reinforcement fiber into coils around a form having a longitudinal axis, wherein the winding step forms each coil into an elongated shape, having two generally parallel lengths, moving the coils toward a cutter and axially with respect to the form to engage the cutter while maintaining the two lengths of each coil generally parallel to each other, cutting the coils with the cutter to separate the two lengths into two discrete length reinforcement fibers that are elongated and generally parallel to each other, and dispensing the discrete length reinforcement fibers in an axial direction with respect to the form, with the discrete length reinforcement fibers being relatively parallel to each other.

12. The method of claim 11 which the discrete length reinforcement fibers are dispensed onto a generally horizontal collecting surface, and the discrete length reinforcement fibers are dispensed generally parallel to the collecting surface.

13. The method of claim 11 in which the step of moving the coils axially with respect to the form to engage the cutter is accomplished by engaging the coils with a helical surface which is rotating relative to the coils.

14. The method of claim 11 in which the discrete length reinforcement fibers are oriented generally perpendicular to the axis of the form as the discrete length reinforcement fibers are dispensed.

\* \* \* \* \*